United States Patent
Zeng et al.

(10) Patent No.: US 10,790,904 B2
(45) Date of Patent: Sep. 29, 2020

(54) REDUNDANT BACKUP NEAR-END MACHINE, FAR-END MACHINE AND SYSTEM THEREOF FOR DIGITAL OPTICAL FIBER REPEATER

(71) Applicant: Comba Telecom Systems (China) Limited, Guangzhou, Guangdong (CN)

(72) Inventors: Xiaosong Zeng, Guangdong (CN); Hui Zhang, Guangdong (CN); Xiaoyong Chen, Guangdong (CN)

(73) Assignee: Comba Telecom Systems (China) Limited (CN)

( * ) Notice: Subject to any disclaimer, the term of this patent is extended or adjusted under 35 U.S.C. 154(b) by 0 days.

(21) Appl. No.: 16/478,530

(22) PCT Filed: Dec. 27, 2017

(86) PCT No.: PCT/CN2017/119004
§ 371 (c)(1),
(2) Date: Jul. 17, 2019

(87) PCT Pub. No.: WO2018/133636
PCT Pub. Date: Jul. 26, 2018

(65) Prior Publication Data
US 2020/0044742 A1  Feb. 6, 2020

(30) Foreign Application Priority Data

Jan. 19, 2017 (CN) .......................... 2017 1 0038285

(51) Int. Cl.
*H04B 10/2575* (2013.01)
*H04B 10/032* (2013.01)
*H04B 10/29* (2013.01)

(52) U.S. Cl.
CPC ..... *H04B 10/25759* (2013.01); *H04B 10/032* (2013.01); *H04B 10/29* (2013.01)

(58) Field of Classification Search
None
See application file for complete search history.

(56) References Cited

U.S. PATENT DOCUMENTS

2014/0314401 A1  10/2014 Fujimori

FOREIGN PATENT DOCUMENTS

| CN | 101697623 A | 4/2010 |
|---|---|---|
| CN | 103595478 A | 2/2014 |

(Continued)

OTHER PUBLICATIONS

Human translation of Drawings 1-3 of CN103595478 and Examiner added labels of Drawings 2-3.*

(Continued)

*Primary Examiner* — Casey L Kretzer
(74) *Attorney, Agent, or Firm* — Lerner, David, Littenberg, Krumholz & Mentlik, LLP

(57) ABSTRACT

A redundant backup near-end machine, a far-end machine and a system of a digital optical fiber repeater is disclosed. It includes a near-end machine, a far-end machine and an optical fiber, and the near-end machine includes a near-end duplexer module, at least two near-end digital monitoring modules, and a near-end optical interface board module. The near-end optical interface board module includes a near-end digital optical module, and each near-end digital monitoring module is connected in parallel between the near-end duplexer module and the near-end optical interface board module. The far-end machine includes a far-end optical interface board module, at least two far-end digital monitoring modules, a power amplifier module, and a far-end low noise amplifier duplexer module. The far-end optical interface board module includes a far-end digital optical module.

6 Claims, 4 Drawing Sheets

(56) References Cited

FOREIGN PATENT DOCUMENTS

| | | |
|---|---|---|
| CN | 203554115 U | 4/2014 |
| CN | 105337668 A | 2/2016 |
| CN | 205681417 U | 11/2016 |
| CN | 106850032 A | 6/2017 |
| CN | 206533365 U | 9/2017 |

OTHER PUBLICATIONS

International Search Report PCT/CN2017/119004, dated Mar. 16, 2018.

* cited by examiner

REDUNDANT BACKUP NEAR-END MACHINE, FAR-END MACHINE AND SYSTEM THEREOF FOR DIGITAL OPTICAL FIBER REPEATER

CROSS-REFERENCE TO RELATED APPLICATIONS

The present application is a national phase entry under 35 U.S.C § 371 of International Application No. PCT/CN2017/119004 filed Dec. 27, 2017, which claims priority from Chinese Application No. 201710038285.1 filed Jan. 19, 2017, all of which are hereby incorporated herein by reference.

FIELD OF THE INVENTION

The present invention relates to the field of mobile communications, and in particular, the present invention relates to a redundant backup near-end machine, far-end machine and system thereof for digital optical fiber repeater.

BACKGROUND OF THE INVENTION

With the rapid development of high speed railway network construction, GSM-R (Global System for Mobile Communications-Railway) optical fiber repeater has become an important part of the railway mobile communication network. Due to the particularity of railway mobile communication, the GSM-R optical fiber repeater in the network must have redundant backup technology to improve the reliability of mobile network communication. At present, the GSM-R digital optical fiber repeater of the 1+1 single-machine module redundant backup technology is gradually adopted in the railway mobile communication network. However, in the prior art, a digital intermediate frequency module is integrated with a digital optical module, and when the digital intermediate frequency module is switched, the digital optical module needs to be switched at the same time, and the reliability is not high, as shown in FIG. 1. Therefore, the reliability and stability of prior art mobile network communications need to be further improved.

SUMMARY OF THE INVENTION

A primary objective of the present invention is to provide a redundant backup near-end machine for a digital optical fiber repeater.

A second objective of the present invention is to provide a redundant backup far-end machine for a digital optical fiber repeater.

A third objective of the present invention is to provide a redundant backup system for a digital optical fiber repeater.

In order to achieve the above objectives, the present invention provides the following technical solution.

A redundant backup near-end machine of a digital optical fiber repeater includes a near-end duplexer module, at least two near-end digital monitoring modules, and a near-end optical interface board module, all of which are connected with each other in sequence. The near-end optical interface board module includes a near-end digital optical module, and each of the near-end digital monitoring modules is connected in parallel between the near-end duplexer module and the near-end optical interface board module.

Preferably, the near-end optical interface board module includes at least two near-end digital optical modules.

A redundant backup far-end machine of a digital optical fiber repeater includes a far-end optical interface board module, at least two far-end digital monitoring modules, a power amplifier module, and a far-end low noise amplifier duplexer module, all of which are sequentially connected with each other. The far-end optical interface board module includes a far-end digital optical module. In a downlink channel, each far-end digital monitoring module is connected in parallel between the far-end optical interface board module and the power amplifier module. In an uplink channel, each of the far-end digital monitoring modules is connected in parallel between the far-end optical interface board module and the far-end low noise amplifier duplexer module.

Preferably, the far-end optical interface board module includes at least two far-end digital optical modules.

Preferably, the power amplifier module includes at least two power amplifier units and a high power RF switch unit. Here, input ends of the respective power amplifier units are respectively connected to each far-end digital monitoring module by radio frequency. Output ends of the respective power amplifier units are respectively connected to the high power RF switch unit by radio frequency, and the high power RF switch unit is connected to the far-end low noise amplifier duplexer module.

Preferably, the far-end low noise amplifier duplexer module includes an uplink main channel low noise amplifier and an uplink diversity channel low noise amplifier, and they are respectively connected to each far-end digital monitoring module through radio frequency. Here, the uplink main channel low noise amplifier and the uplink diversity channel low noise amplifier are each provided with a first RF channel and a second RF channel.

A redundant backup system for a digital optical fiber repeater includes a near-end machine, a far-end machine, and an optical fiber connecting the near-end machine and the far-end machine together. The far-end machine includes a far-end optical interface board module that, at least two far-end digital monitoring modules, a power amplifier module, and a far-end low noise amplifier duplexer module, all of which are sequentially connected together. The far-end optical interface board module includes at least two far-end digital optical modules. In the downlink channel, each far-end digital monitoring module is connected in parallel between the far-end optical interface board module and the power amplifier module; and in the uplink channel, each of the far-end digital monitoring modules is connected in parallel between the far-end optical interface board module and the far-end low noise amplifier duplexer module.

Preferably, the far-end optical interface board module includes at least two far-end digital optical modules; and/or, The power amplifier module includes at least two power amplifier units and a high power RF switch unit. Here, input ends of the respective power amplifier units are respectively connected to each far-end digital monitoring module by radio frequency. Output ends of the respective power amplifier units are respectively connected to the high power RF switch unit by radio frequency. The high power RF switch unit is connected to the far-end low noise amplifier duplexer module, and/or The far-end low noise amplifier duplexer module includes an uplink main channel low noise amplifier and an uplink diversity channel low noise amplifier, and they are respectively connected to each far-end digital monitoring module through radio frequency. Here, the uplink main channel low noise amplifier and the uplink diversity channel low noise amplifier are each provided with a first RF channel and a second RF channel.

Preferably, the near-end machine includes a near-end duplexer module, at least two near-end digital monitoring modules, and a near-end optical interface board module, all of which are connected together in sequence. The near-end optical interface board module includes a near-end digital optical module. Each of the near-end digital monitoring modules is connected in parallel between the near-end duplexer module and the near-end optical interface board module.

Preferably, the near-end optical interface board module includes at least two near-end digital optical modules. Each of the near-end digital optical modules is respectively connected to each of the far-end digital optical modules through an optical fiber.

Compared with the prior art, the solution of the present invention has the following advantages.

In an embodiment of the invention, the near-end digital monitoring module is connected to the near-end optical interface board module through a high speed data interface. The near-end digital optical module is included in the near-end optical interface board module to separate the near-end digital monitoring module from the near-end digital optical module, thus realizing independent redundant backup. When switching between near-end digital monitoring modules, there is no need to switch between near-end digital optical modules; vice versa.

Similarly, the far-end digital monitoring module and the far-end digital optical module may have independent redundant backup. When switching between far-end digital monitoring modules, there is no need to switch between far-end digital optical modules; vice versa.

It can be seen that the fault tolerance rate between the near-end digital monitoring module and the far-end digital monitoring module can be improved; and the reliability of the abnormal processing of the digital fiber-optic repeater system can be improved.

The additional aspects and advantages of the invention will be set forth in part in the description which follows.

BRIEF DESCRIPTION OF THE DRAWINGS

The above and/or additional aspects and advantages of the present invention will become apparent and readily understood from the accompanied drawings, in which.

DETAILED DESCRIPTION OF THE INVENTION

Figure 1:
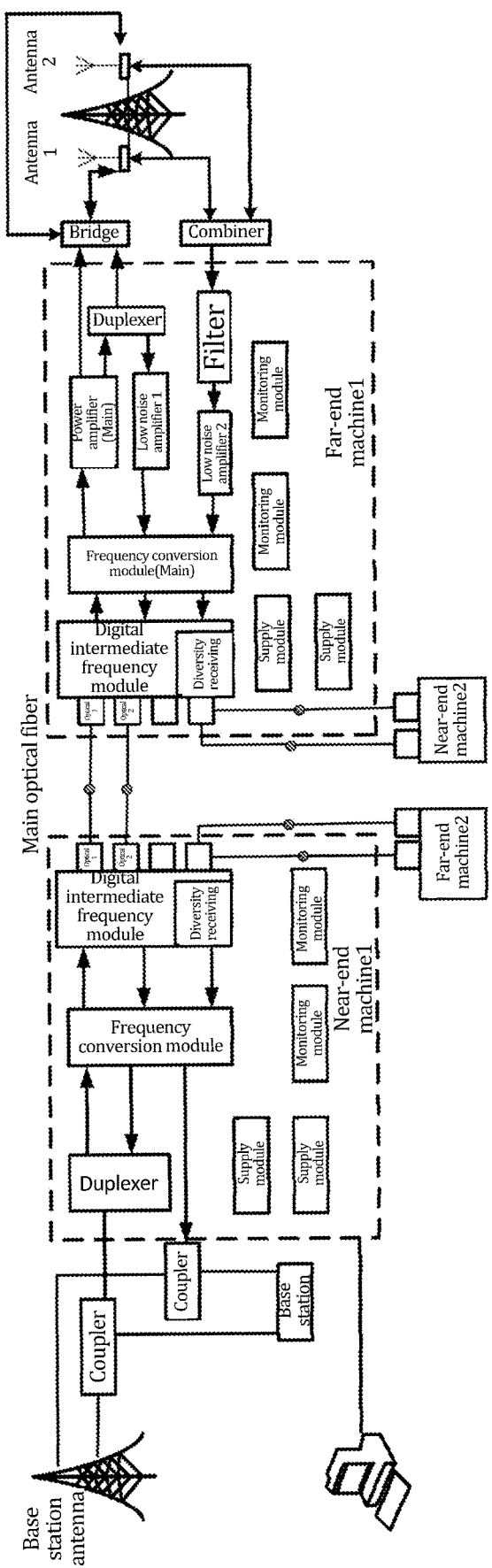
FIG. 1 is a schematic structural diagram of a redundant backup system for a digital optical fiber repeater in the prior art.

The embodiments of the present invention are described in detail below, and the examples of the embodiments are illustrated in the drawings, wherein the same or similar reference numerals are used to refer to the same or similar elements or elements having the same or similar functions. The embodiments described below with reference to the drawings are intended to be illustrative of the invention and are not to be construed as limiting.

Figure 2:
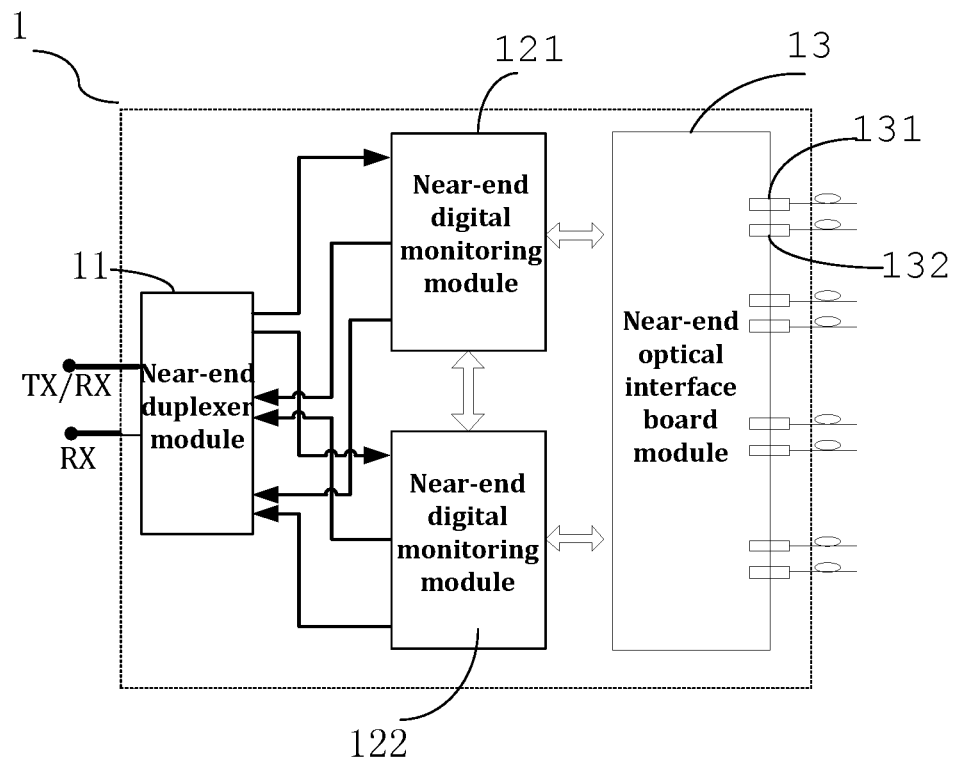
FIG. 2 is a schematic structural diagram of a redundant backup near-end machine of a digital optical fiber repeater according to an embodiment of the present invention.

FIG. 2 is a schematic structural diagram of a redundant backup near-end machine 1 of a digital optical fiber repeater according to an embodiment of the present invention. A near-end machine 1 includes a near-end duplexer module 11, at least two near-end digital monitoring modules 121, 122, and a near-end optical interface board module 13, all of which are connected with each other in sequence. The near-end optical interface board module 13 includes a near-end digital optical module, and each of the near-end digital monitoring modules 121 and 122 is connected in parallel between the near-end duplexer module 11 and the near-end optical interface board module 13.

Specifically, the near-end optical interface board module 13 includes at least two near-end digital optical modules 131 and 132. In an embodiment of the present invention, the near-end optical interface board module 13 can be plugged with 4 pairs (8) of near-end digital optical modules that are mutually hot backup. The near-end digital optical modules 131 and 132 are mutually hot backups. When the near-end digital optical module 131 is abnormal, it is switched to the near-end digital optical module 132 to continue working, and vice versa.

The near-end digital monitoring modules 121 and 122 are mutually hot backups, and the status of each other is monitored in real time through a data line connection. When an abnormality occurs in the near-end digital monitoring module 121, the near-end digital monitoring module 122 monitors the abnormality of the near-end digital monitoring module 121, and switches to the near-end digital monitoring module 122 to continue working, and vice versa.

Thereby, independent redundant backup between the near-end digital monitoring modules 121, 122 and that between the near-end digital optical modules 131, 132 are realized. When switching between the near-end digital monitoring modules 121 and 122, there is no need to switch between the near-end digital optical modules 131 and 132, and vice versa, thereby improving the reliability of the redundant backup of the near-end digital monitoring module and the near-end digital optical module in the near-end machine.

High speed data interfaces (not labeled, the same below) are respectively disposed on the near-end digital monitoring modules 121 and 122 and the near-end optical interface board module 13. The near-end digital monitoring modules 121 and 122 are respectively connected to the near-end optical interface board module 13 by means of high speed data interfaces.

The near-end digital monitoring modules 121 and 122 are respectively connected to the near-end duplexer module 11 by radio frequency. The near-end duplexer module 11 is provided with TX/RX and RX ports for receiving signals from the base station or outputting signals, wherein the near-end machine includes an uplink channel and a downlink channel.

Figure 3:
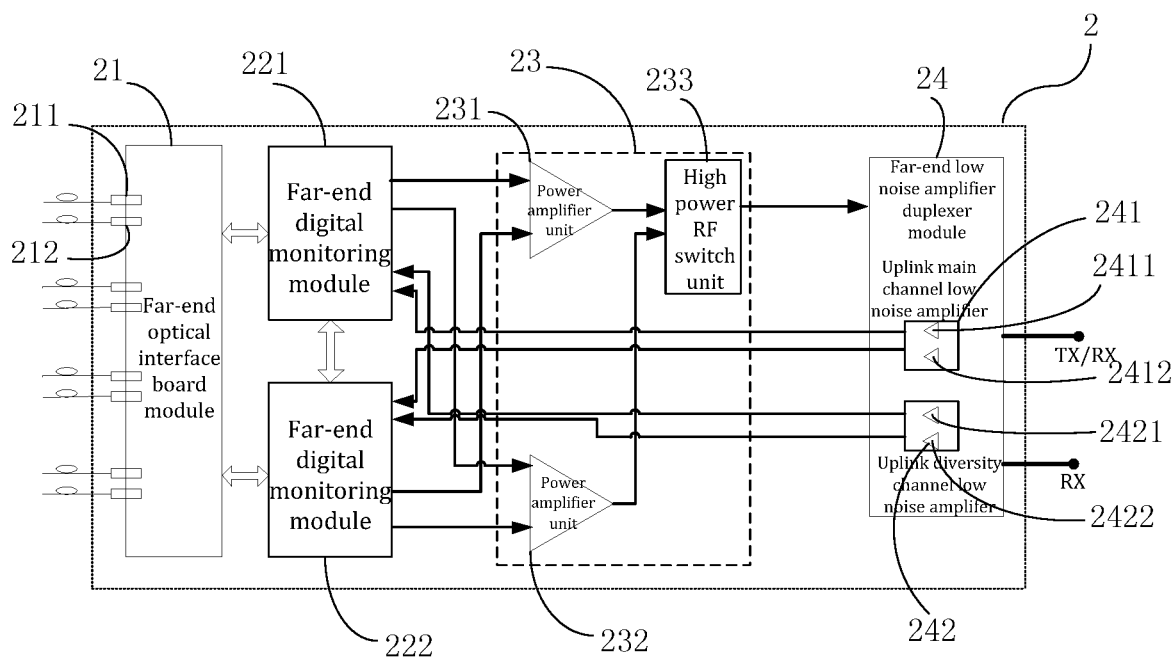
FIG. 3 is a schematic structural diagram of a far-end backup far-end machine of a digital optical fiber repeater according to an embodiment of the present invention.

FIG. 3 is a schematic structural diagram of a redundant backup far-end machine 2 of a digital optical fiber repeater according to an embodiment of the present invention. The far-end unit 2 includes a far-end optical interface board module 21, at least two far-end digital monitoring modules 221 and 222, a power amplifier module 23, and a far-end low noise amplifier duplexer module 24. The far-end optical interface board module 21 includes a far-end digital optical module. In the downlink channel, the far-end digital monitoring modules 221, 222 are connected in parallel between the far-end optical interface board module 21 and the power amplifier module 23. In the uplink channel, the far-end digital monitoring modules 221, 222 are connected in parallel between the far-end optical interface board module 21 and the far-end low noise amplifier duplexer module 24.

The far-end digital monitoring modules 221 and 222 are mutually hot backups, and are connected to each other through a data line to monitor the status of the other one in real time. When the far-end digital monitoring module 221 is abnormal, the far-end digital monitoring module 222 monitors the abnormality of the far-end digital monitoring module 221, and switches to the far-end digital monitoring module 222 to continue working, and vice versa.

Specifically, the far-end optical interface board module 21 includes at least two far-end digital optical modules 211, 212. In an embodiment of the present invention, the far-end optical interface board module 21 can be plugged with 4 pairs (8) of far-end digital optical modules that are mutually hot backups. The far-end digital optical modules 211 and 212 are hot backups of each other. When the far-end digital optical module 211 is abnormal, it is switched to the far-end digital optical module 212 to continue working, and vice versa.

Thereby, independent redundant backup between the far-end digital monitoring modules 221, 222 and that between the far-end digital optical modules 211, 212 are realized. When switching between the far-end digital monitoring modules 221 and 222 occurs, there is no need to switch between the far-end digital optical modules 211 and 212, and vice versa. Therefore, the reliability of the redundant backup of the far-end digital monitoring module and the far-end digital optical module in the far-end machine is improved.

Specifically, the power amplifier module 23 includes at least two power amplifier units 231 and 232 and a high power RF switch unit 233. Input ends of the power amplifier units 231 and 232 are respectively connected to the far-end digital monitoring modules 221 and 222 by radio frequency. Output ends of the power amplifier units 231 and 232 are respectively connected to the high power RF switch unit 233 by radio frequency. The high power RF switch unit 233 and the far-end low noise duplexer module 24 are connected by radio frequency. The power amplifier units 231 and 232 and the high power RF switch unit 233 are cold backups of one another. That is, when the power amplifier unit 231 is in operation, the high power RF switch unit 233 and the power amplifier unit 231 are connected, and the power amplifier unit 232 and the high power RF switch unit 233 are disconnected. When the power amplifier unit 231 is abnormal, the power amplifier unit 231 is disconnected from the high power RF switch unit 233, and the power amplifier unit 232 and the high power RF switch unit 233 are connected, so that the power amplifier module 23 can continue to work.

Specifically, the far-end low noise amplifier duplexer module 24 includes an uplink main channel low noise amplifier 241 and an uplink diversity channel low noise amplifier 242, which are connected to the far-end digital monitoring module 221, 222 by radio frequency respectively. The uplink main channel low noise amplifier 241 is provided with a first RF channel 2411 and a second RF channel 2412. A first RF channel 2421 and a second RF channel 2422 are disposed in the uplink diversity channel low noise amplifier 242. The first RF channel 2411 and the second RF channel 2412 of the uplink main channel low noise amplifier 241 are independent of each other, and are mutually cold backups. When the first RF channel 2411 is abnormal, it is switched to the second RF channel 2412 to continue working, and vice versa. Similarly, the first RF channel 2421 and the second RF channel 2422 of the uplink diversity channel low noise amplifier 242 are independent of each other, and are mutually cold backups. When an abnormality occurs in the first RF channel 2421, switching to the second RF channel 2422 is performed to continue operation, and vice versa.

The far-end low noise amplifier duplexer module 24 is provided with TX/RX and RX ports for receiving signals transmitted by the antenna feeding system or outputting signals transmitted by the base station.

Figure 4:
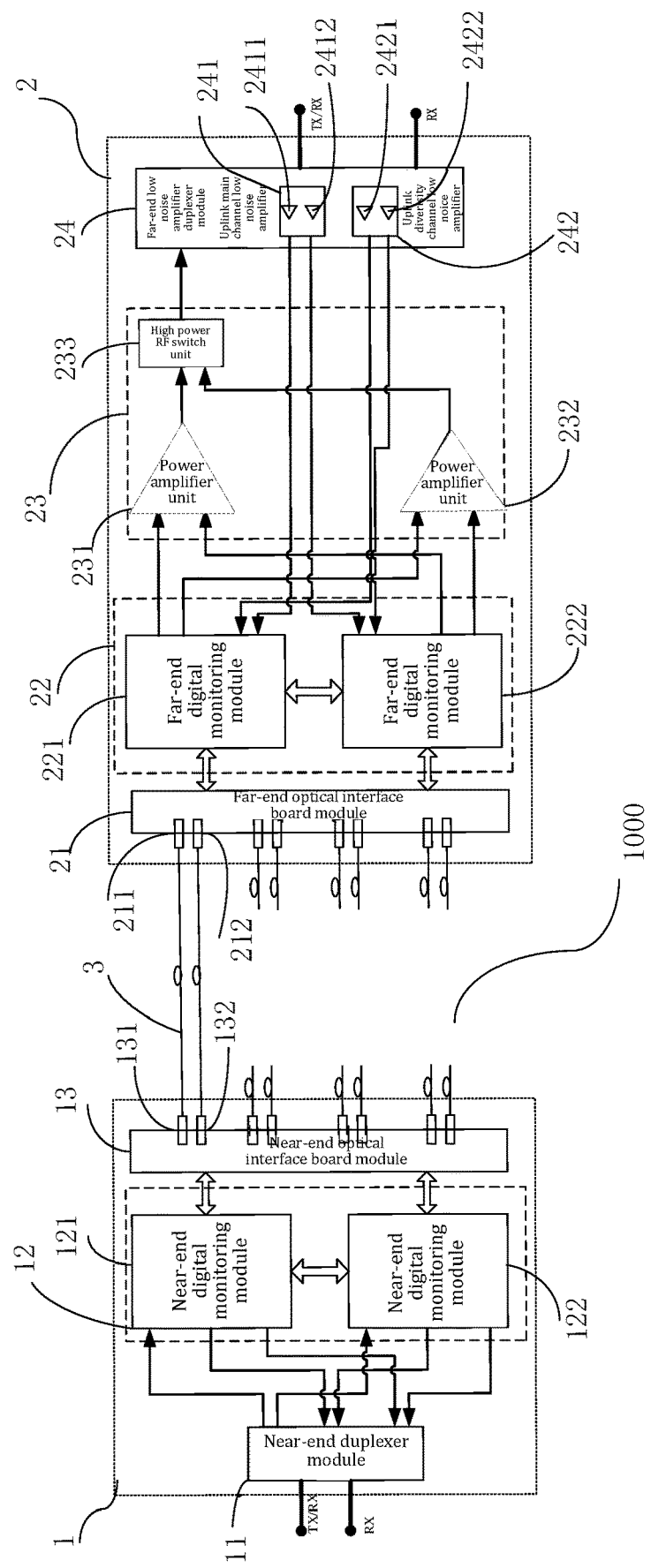
FIG. 4 is a schematic structural diagram of a digital optical fiber repeater redundant backup system according to an embodiment of the present invention.

FIG. 4 is a schematic structural diagram of a redundant backup system 1000 of a digital optical fiber repeater according to an embodiment of the present invention. It includes a near-end machine 1, a far-end machine 2, and an optical fiber 3 connecting the near-end machine and the far-end machine. The far-end unit 2 includes a far-end optical interface board module 21, at least two far-end digital monitoring modules 221 and 222, a power amplifier module 23, and a far-end low noise amplifier duplexer module 24, all of which are connected in sequence. The far-end optical interface board module 21 includes at least two far-end digital optical modules 211 and 212. In the downlink channel, the far-end digital monitoring modules 221 and 222 are connected in parallel between the far-end optical interface board module 21 and the power amplifier module 23. In the uplink channel, far-end digital monitoring modules 221 and 222 are connected in parallel between the far-end optical interface board module 21 and the far-end low noise amplifier duplexer module 24.

Specifically, the far-end optical interface module 21 includes at least two far-end digital optical modules 211 and 212, and the far-end digital optical modules are respectively connected to the near-end digital optical modules 131 and 132 through optical fibers 3; and/or The power amplifier module 23 includes at least two power amplifier units 231 and 232 and a high power RF switch unit 233. Input ends of the power amplifier units 231 and 232 are respectively connected to the far-end digital monitoring modules through radio frequency. Output ends of the respective power amplifier units are respectively connected to the high power RF switch unit 233 by radio frequency; and/or The far-end low noise amplifier duplexer module 24 includes an uplink main channel low noise amplifier 241 and an uplink diversity channel low noise amplifier 242, which are connected to each far-end digital monitoring module through radio frequency. The uplink main channel low noise amplifier 241 is provided with a first radio frequency channel 2411 and a second radio frequency channel 2412, and the uplink diversity channel low noise amplifier 242 is provided with a first radio frequency channel 2421 and a second radio frequency channel 2422.

The near-end machine 1 includes a near-end duplexer module 11, at least two near-end digital monitoring modules 121 and 122, and a near-end optical interface board module 13, all of which are connected in sequence. The near-end optical interface board module 13 includes a near-end digital optical module. Each of the near-end digital monitoring modules is connected in parallel between the near-end duplexer module 11 and the near-end optical interface board module 13.

The near-end optical interface board module 13 includes at least two near-end digital optical modules 131 and 132.

Each of the near-end digital optical modules is connected to each of the far-end digital optical modules through the optical fiber 3.

The signal flow direction in the digital optical fiber repeater of the present invention is as follows.

In the downlink channel, after coupled in the base station, the wireless signal comes out from the base station, and then passes the near-end duplexer module 11, the near-end digital monitoring module 12, and the near-end optical interface board module 13 of the near-end machine 1. The electric signal is converted into an optical signal by electro-optical conversion; the optical signal is input from the near-end machine to the optical fiber 3, and transmitted to the far-end unit 2 through the optical fiber 3. The optical signal in turn flows through the far-end optical interface board module 21 and the far-end digital monitoring module 22. After that, the optical signal is converted into an electrical signal, and the electrical signal enters the power amplifier module 23 for amplification, and the signal is amplified and sent to a transmitting antenna through the far-end low noise amplifier duplexer module 24 to cover the target area. The working principle of the uplink channel is the same. The signal transmitted by the terminal such as the mobile phone passes through a receiving antenna to the far-end machine, then to the near-end machine, and finally back to the base station.

Figure 5:
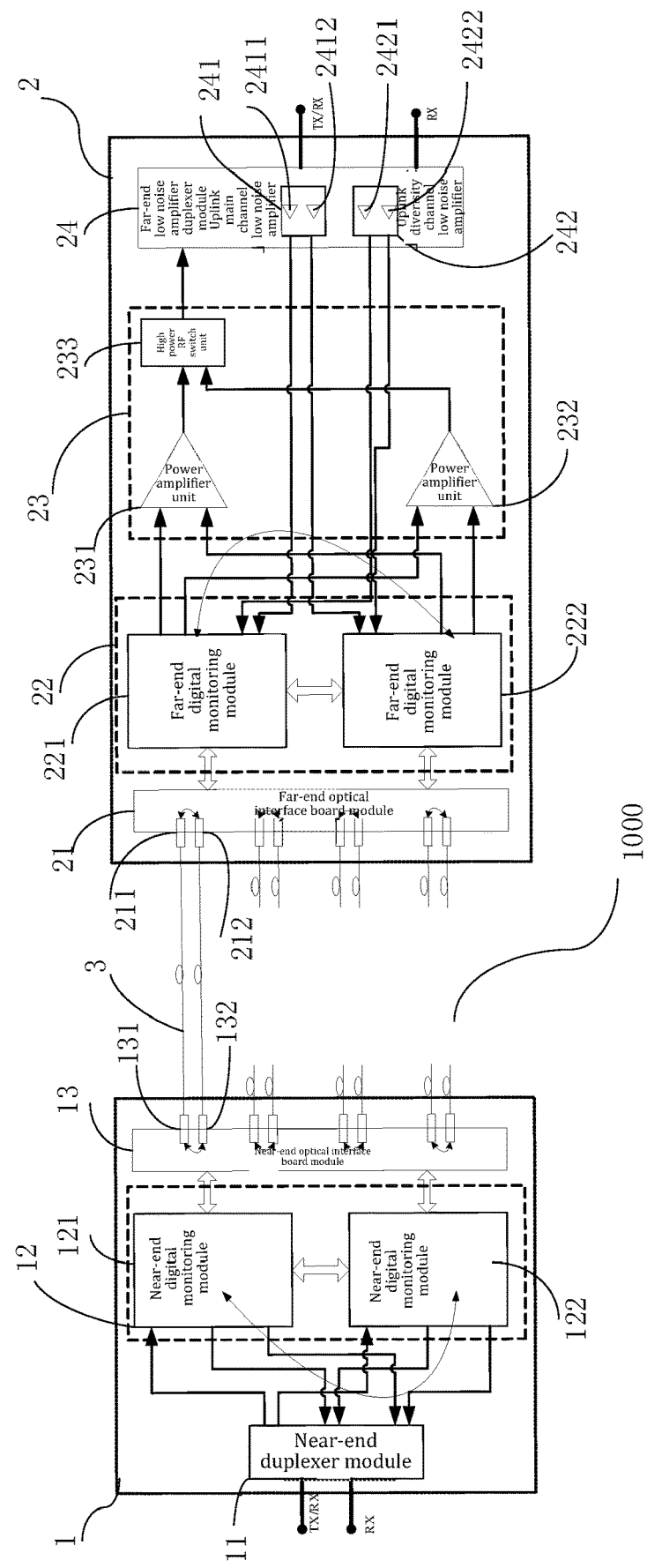
FIG. 5 is a schematic diagram showing a backup working principle of a digital monitoring module and a digital optical module in a redundant backup near-end machine and a far-end machine of a digital optical fiber repeater according to an embodiment of the present invention.

FIG. 5 is a schematic diagram of the working principle of the digital monitoring module and the digital optical module in the near-end machine and the far-end unit in the redundant backup system of the digital optical fiber repeater according to the embodiment of the present invention.

Assume that the system runs in a default state (the near-end digital monitoring module 121, the near-end digital optical module 131, the far-end digital optical module 211, the far-end digital monitoring module 221, the power amplifier unit 231, the uplink main channel low noise amplifier's first RF channel 2411, and the uplink diversity channel low noise amplifier's first RF channel 2421 are in operation). Taking the downlink channel as an example, when there is no abnormality in the system, the downlink signal is input by the TX/RX port and then is input to the near-end digital monitoring module 121 and the near-end digital monitoring module 122 respectively through the near-end duplexer module 11. According to the default state of the system, the near-end digital monitoring module 121 is in operating state (having control over the near-end optical interface board module 13). The downlink signal is output to the near-end optical interface board module 13 through the near-end digital monitoring module 121. At this time, the near-end digital monitoring module 122 is in a standby state, and it does not output a signal, but it has real-time data interaction with the near-end digital monitoring module 121 to monitor whether an abnormal state occurs. The near-end digital optical modules 131 and 132 of the near-end optical interface board module 13 receive the downlink signals simultaneously, and then transmit the downlink signals to the far-end digital optical modules 211 and 212 of the far-end optical interface module 21 through the optical fiber 3. The signals received by the far-end digital optical modules 211 and 212 simultaneously enter the far-end digital monitoring module 221 and the far-end digital monitoring module 222 through the high speed data interface. The far-end digital monitoring module 221 is in an operating state (which controls the far-end optical interface board module 21, the power amplifier unit 231, the power amplifier unit 232, the high power RF switch unit 233, the uplink main channel low noise amplifier 241, and the uplink diversity channel low noise amplifier 242). According to a default setting, the signal transmitted from the far-end digital optical module 211 is received, and the signal is output to the power amplifier unit 231 and the power amplifier unit 232, but the signal transmitted from the far-end digital optical module 212 is not processed. The power amplifier unit 231 is connected to the high power RF switch unit 233, and the signal is output to the far-end low noise duplexer module 24 and then is output to an antenna feeder system via the TX/RX port. The far-end digital monitoring module 222 is in a standby state, and it does not output a signal, but it has real-time data interaction with the far-end digital monitoring module 221 to monitor its status. The power amplifier unit 232 is in a standby state and is disconnected from the high power RF switch unit 233.

When an abnormality occurs in the near-end digital monitoring module 121 (which may be a hardware abnormality, a digital or monitoring software abnormality), the near-end digital monitoring module 122 detects an abnormality and starts a backup switching process. The near-end digital monitoring module 122 is set as operating, and the signal output of the near-end digital monitoring module 121 is turned off, and a warning is issued, waiting for repair. After the near-end digital monitoring module 121 is repaired, if the abnormality of the near-end digital monitoring module 122 is detected, the backup switching process is started again. Other modules are not affected by backup switching, so the system can continue to work normally.

When the far-end digital monitoring module 221 is abnormal (which may be a hardware abnormality, or a digital or monitoring software abnormality), the far-end digital monitoring module 222 detects an abnormality and starts a backup switching process. The far-end digital monitoring module 222 is set as the operating device, and the output of the far-end digital monitoring module 221 is turned off, and a warning is issued, waiting for repair. After the far-end digital monitoring module 221 is repaired, if the abnormality of the far-end digital monitoring module 222 is detected, the backup switching process is started again. Other modules are not affected by backup switching, so the system can continue to work normally.

When the near-end digital optical module 131 is abnormal (may be a hardware abnormality, or a software, or optical fiber link abnormality), the main near-end digital monitoring module 121 and the far-end digital monitoring module 221 start the backup switching process. The near-end digital optical module 132 is used as the operating device, and the output of the near-end digital optical module 131 is turned off, and a warning is issued, waiting for repair. At the same time, the main far-end digital monitoring module 221 no longer processes the signal transmitted by the far-end digital optical module 211, but processes the signal transmitted by the far-end digital optical module 212. After the near-end digital optical module 131 is repaired, if abnormality of the near-end digital optical module 132 is detected, the backup switching process is started again, so that the system can continue to work normally.

When the far-end digital optical module 211 is abnormal (may be a hardware, or software, or optical fiber link abnormality), the main near-end digital monitoring module 121 and the far-end digital monitoring module 221 start the backup switching process. The far-end digital optical module 212 is used as the operating device, and the output of the far-end digital optical module 211 is turned off, and a warning is issued, waiting for repair. At the same time, the main near-end digital monitoring module 121 no longer processes the signal transmitted by the near-end digital optical module 131, but it processes the signal transmitted by the near-end digital optical module 132. After the far-end digital optical module 211 is repaired, if the far-end digital optical module 212 is abnormal, the backup switching process is started again so that the system can continue to work normally.

In summary, in the embodiment of the present invention, the near-end digital monitoring module is connected to the near-end optical interface board module through a high speed data interface, and the near-end digital optical module is included in the near-end optical interface board module, thus realizing separation of the near-end digital monitoring module from the near-end digital optical module to achieve independent redundant backup. That is, when switching is performed between near-end digital monitoring modules, there is no need to switch between near-end digital optical modules; and vice versa.

Similarly, the far-end digital monitoring module and the far-end digital optical module can also redundant back up independently. When switching between far-end digital monitoring modules, there is no need to switch between far-end digital optical modules; and vice versa.

Thereby, the fault tolerance rate when switching between the near-end digital monitoring module and the far-end digital monitoring module can be improved; and the reliability of the abnormal processing of the digital optical fiber repeater system is improved.

Though various embodiments of the present invention have been illustrated above, a person of the art will understand that, variations and improvements made upon the illustrative embodiments fall within the scope of the present invention, and the scope of the present invention is only limited by the accompanying claims and their equivalents.

The invention claimed is:

1. A redundant backup far-end machine of a digital optical fiber repeater, comprising: a far-end optical interface board module, at least two far-end digital monitoring modules, a power amplifier module, and a far-end low noise amplifier duplexer module, all of which are sequentially connected with each other; the far-end optical interface board module comprises a far-end digital optical module; in a downlink channel, each far-end digital monitoring module is connected in parallel between the far-end optical interface board module and the power amplifier module; and in an uplink channel, each of the far-end digital monitoring modules is connected in parallel between the far-end optical interface board module and the far-end low noise amplifier duplexer module, wherein the power amplifier module comprises at least two power amplifier units and a high power Radio Frequency switch unit; input ends of the respective power amplifier units are respectively connected to each far-end digital monitoring module by radio frequency; output ends of the respective power amplifier units are respectively connected to the high power RF switch unit by radio frequency, and the high power RF switch unit is connected to the far-end low noise amplifier duplexer module.

2. The redundant backup far-end machine as recited in claim 1, wherein the far-end optical interface board module includes at least two far-end digital optical modules.

3. The redundant backup far-end machine as recited in claim 1, wherein the far-end low noise amplifier duplexer module comprises an uplink main channel low noise amplifier and an uplink diversity channel low noise amplifier, and they are respectively connected to each far-end digital monitoring module through radio frequency; and the uplink main channel low noise amplifier and the uplink diversity channel low noise amplifier are each provided with a first RF channel and a second RF channel.

4. A redundant backup system for a digital optical fiber repeater, comprising:
a near-end machine, a far-end machine, and an optical fiber connecting the near-end machine and the far-end machine together; the far-end machine comprises a far-end optical interface board module, at least two far-end digital monitoring modules, a power amplifier module, and a far-end low noise amplifier duplexer module, all of which are sequentially connected together; the far-end optical interface board module comprises at least two far-end digital optical modules; in the downlink channel, each far-end digital monitoring module is connected in parallel between the far-end optical interface board module and the power amplifier module; and in the uplink channel, each of the far-end digital monitoring modules is connected in parallel between the far-end optical interface board module and the far-end low noise amplifier duplexer module, wherein the far-end optical interface board module comprises at least two far-end digital optical modules; and,
the power amplifier module comprises at least two power amplifier units and a high power RF switch unit; input ends of the respective power amplifier units are respectively connected to each far-end digital monitoring module by radio frequency; output ends of the respective power amplifier units are respectively connected to the high power RF switch unit by radio frequency; and the high power RF switch unit is connected to the far-end low noise amplifier duplexer module.

5. The redundant backup system as recited in claim 4, wherein the near-end machine comprises a near-end duplexer module, at least two near-end digital monitoring modules, and a near-end optical interface board module, all of which are connected together in sequence; the near-end optical interface board module comprises a near-end digital optical module; and each of the near-end digital monitoring modules is connected in parallel between the near-end duplexer module and the near-end optical interface board module.

6. The redundant backup system as recited in claim 4, wherein a near-end optical interface board module comprises at least two near-end digital optical modules; and each of the near-end digital optical modules is respectively connected to each of the far-end digital optical modules through an optical fiber.

* * * * *